United States Patent [19]

Cook et al.

[11] 4,094,580

[45] June 13, 1978

[54] HERMAPHRODITE OPTICAL FIBER CONNECTOR

[75] Inventors: John Stone Cook, Rumson; Carl Ragnar Sandahl, Morristown, both of N.J.

[73] Assignee: Bell Telephone Laboratories, Incorporated, Murray Hill, N.J.

[21] Appl. No.: 754,602

[22] Filed: Dec. 27, 1976

[51] Int. Cl.² .............................................. G02B 5/14
[52] U.S. Cl. ................................................... 350/96.21
[58] Field of Search ..................................... 350/96 C

[56] References Cited

U.S. PATENT DOCUMENTS

| | | | |
|---|---|---|---|
| 3,989,567 | 11/1976 | Tardy | 350/96 C X |
| 4,019,241 | 4/1977 | Logan | 350/96 C X |
| 4,047,796 | 9/1977 | Kao et al. | 350/96 C |
| 4,050,783 | 9/1977 | Tardy | 350/96 C |

OTHER PUBLICATIONS

F. L. Thiel, R. E. Love, R. L. Smith "In-Line Connectors for Multimode Optical Waveguide Bundles", Applied Optics. vol. 13, No. 2, Feb. 1974, pp. 240-242.

*Primary Examiner*—John K. Corbin
*Assistant Examiner*—Rolf Hille
*Attorney, Agent, or Firm*—A. A. Tirva; John K. Mullarney

[57] ABSTRACT

A hermaphrodite optical fiber connector includes a housing containing a plurality of inner rods and a plurality of outer rods. The inner rods are held in tangential contact with each other forming an aperture for receiving a fiber. An end of the fiber held in the aperture and ends of the inner rods terminate in a planar surface perpendicular to the longitudinal axis of the fiber. The outer rods are secured between the inner rods and the housing and extend past the planar surface, protecting the end of the fiber from damage.

2 Claims, 5 Drawing Figures

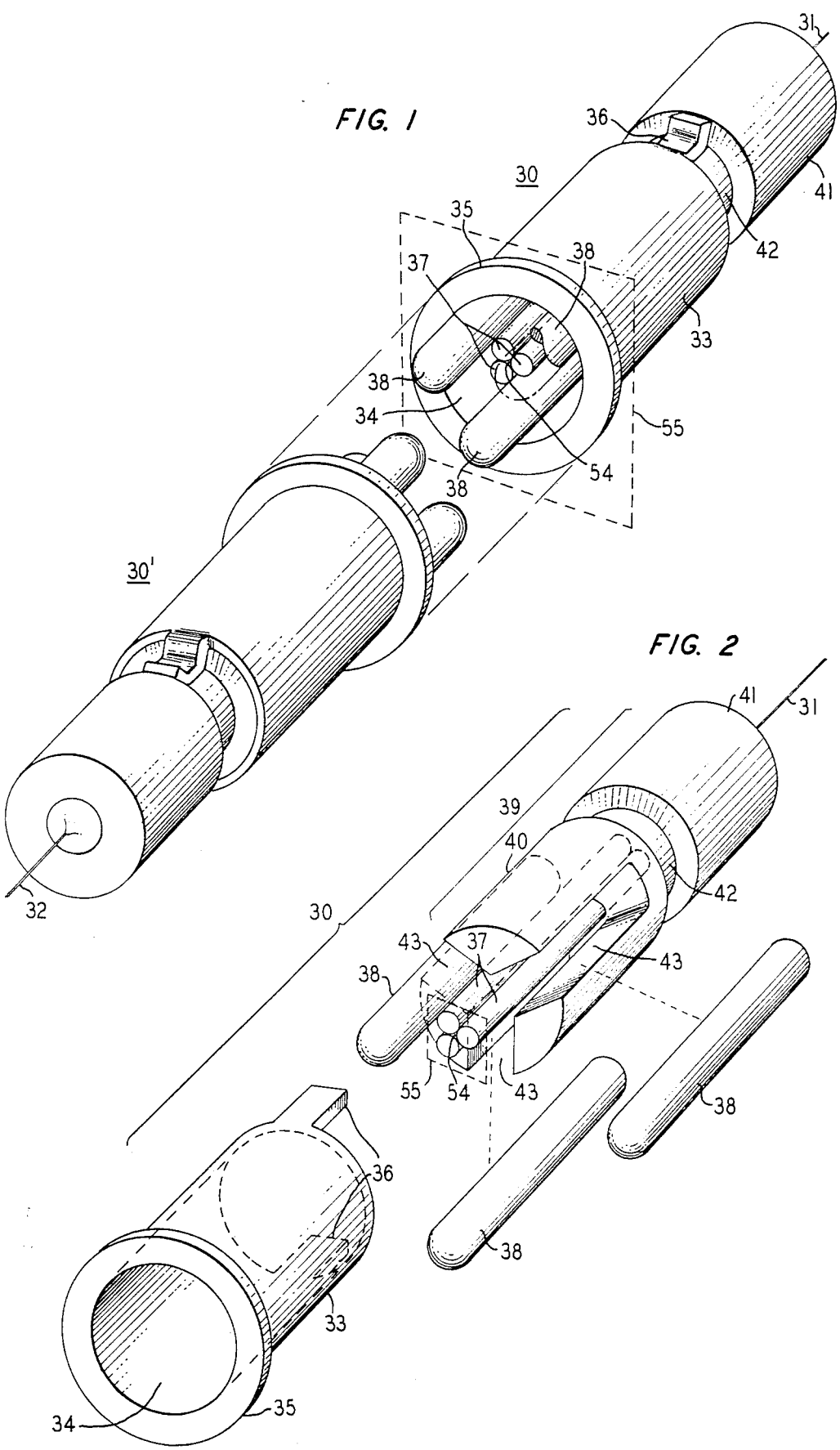

HERMAPHRODITE OPTICAL FIBER CONNECTOR

BACKGROUND OF THE INVENTION

This invention relates to optical fiber communication systems and, particularly, to a connector for connecting two optical fibers used in such systems.

In an optical transmission system, it is necessary to couple optical fibers end-to-end, as well as to devices such as detectors or signal generators. Coupling of optical fibers in an end-to-end relationship is a difficult task, particularly when high coupling efficiencies are required. Any axial misalignment of the fibers or damage to the ends of the fibers will attenuate the signal across the coupling.

In the past, connectors using nested rods have been used to insure accurate alignment of optical fibers when such fibers have been connected to one another end-to-end. Typically, each fiber has been terminated in a male connector carrying the fiber in an inner set of rods and each male connector has been plugged into a female connector carrying an outer set of rods. The assembly affords accurate fiber alignment but, unfortunately, until the connection is complete each fiber end associated with the male connector is exposed to possible damage.

Therefore, it is an object of the invention to provide an optical fiber connector which axially aligns two fibers end-to-end and protects the end of a fiber from damage before the connector is assembled.

This and other objects of the invention are realized in an illustrative embodiment thereof in which a hermaphrodite optical fiber connector has a housing having a cylindrical opening extending axially therethrough. A plurality of inner rods and a plurality of outer rods are disposed within the opening. The inner rods are held in tangential contact with each other forming an aperture for receiving a fiber. A fiber disposed in the aperture and the inner rods terminate in a planar surface substantially perpendicular to the longitudinal axis of the fiber. The outer rods are secured between the inner rods and the housing and extend past the planar surface protecting the end of the fiber from damage.

A feature of the invention is the outer rods extending past the planar surface for protecting an end of the fiber.

Another feature of the invention is that the outer rods of one connector are spaced apart to accommodate between them the outer rods of a duplicate mating connector.

Yet another feature of the invention is that the outer rods of the two duplicate mating connectors form a nest to accommodate the inner rods of both connectors thereby accurately positioning and axially aligning both fibers.

BRIEF DESCRIPTION OF THE DRAWING

A better understanding of the invention may be derived from the detailed description following as that description is considered with respect to the attached drawings, in which:

FIG. 1 is a perspective view of two hermaphrodite optical fiber connectors embodying the present invention;

FIG. 2 is an exploded perspective view of one of the connectors shown in FIG. 1;

DETAILED DESCRIPTION

Figure 3:
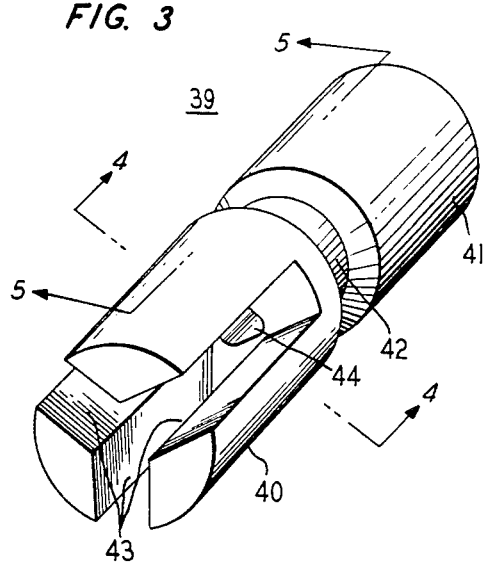
FIG. 3 is a perspective view of a connector body shown in FIG. 2.

In the embodiment of the invention illustrated in FIG. 1, there are shown two substantially identical (duplicate) hermaphrodite optical fiber connectors 30 and 30'. Because the two connectors are identical, only the make-up of connector 30 is discussed herein.

In FIGS. 1 and 2, there is shown the connector 30 having a housing 33 which has an opening 34 extending axially therethrough. Three substantially identical cylindrical inner rods 37 are disposed within the opening 34. The inner rods 37 are held in tangential contact with each other by a connector body 39, shown in FIG. 2. The inner rods 37 are parallel to each other and form an aperture 54 for receiving the optical fiber 31. The end of the fiber 31 and the inner rods 37 terminate in a planar surface 55 which is substantially perpendicular to the longitudinal axis of the fiber 31.

Three substantially identical outer rods 38 are also disposed within the opening 34. The outer rods 38 are secured between the inner rods 37 and the housing 33 by the connector body 39. The ends of the outer rods 38 extend past the planar surface 55, protecting the end of the fiber 31 from damage. The outer rods 38 are spaced equally apart to allow each outer rod of the connector 30' to enter a space between two different outer rods 38. The outer rods 38 and the outer rods of connector 30' are provided with hemispherical ends to aid in the mating of the two sets of outer rods. When connectors 30 and 30' are mated, the outer rods of both of the connectors are forced into tangential contact with each other by the housing 33. The outer rods of both connectors form a nest with a six-sided opening which nests the inner rods 37 of the connector 30 and the inner rods of the connector 30'. The nesting of the inner rods of connector 30 and 30' within the opening formed by the outer rods of both connectors aligns the inner rods of the two connectors and thus accurately positions and axially aligns fibers 31 and 32.

The housing 33 is drawn from a brass sheet and has a flange 35 at one end and tabs 36 at the other end. Because the housing 33 holds the three outer rods 38 and the three outer rods from connector 30' in tangential contact with each other, the opening 34 is made smaller than the major diameter of the nest formed by the six outer rods. This insures that the housing 33 exerts radial pressure upon each outer rod. The wall thickness of the housing 33 is made sufficiently thick to develop the required radial pressure.

The inner and outer rods are made of chrome steel and are sold commercially as bearing rollers. The rods are available in a number of different diameters and lengths. The tolerance on each diameter is held, for example, to ±0.00001 inch.

The fiber 31 is a typical commercially available optical fiber comprised of a glass core and a glass cladding.

In FIGS. 2 and 3, there is shown the connector body 39 which is molded from nylon. None of the dimensions of the connector body 39 are critical. The connector body 39 has a first cylindrical portion 40 having a diameter which is less than the diameter of cylindrical opening 34 of the connector housing 33. This facilitates easy insertion of the first cylindrical portion 40 into the opening 34. The length of the first cylindrical portion 40 is less than the length of the opening 34 to allow outer rods from connector 30' to fit into the opening 34. The connector body 39 further has a second cylindrical portion 41 which has substantially the same diameter that the first cylindrical portion 40 has. The first and second cylindrical portions are connected by a third cylindrical portion 42 having a diameter smaller than the diameter of both the first and second cylindrical portions 40 and 41.

Figure 4:
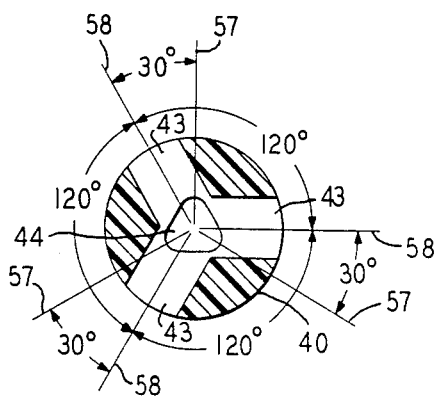
FIG. 4 is a sectional view of the connector body as shown generally along plane 4—4 of FIG. 3.

In FIGS. 2, 3, and 4, there are shown three equally spaced slots 43 in the cylindrical portion 40. The slots 43 extend from the outer perimeter of the first cylindrical portion 40 towards its center. The width of each slot 43 is less than the diameter of an outer rod 38 to insure an interference fit between each outer rod 38 and a slot 43. The length of each slot 43 is not critical as long as outer rods 38 do not bottom out during the final assembly of the connector 30.

Figure 5:
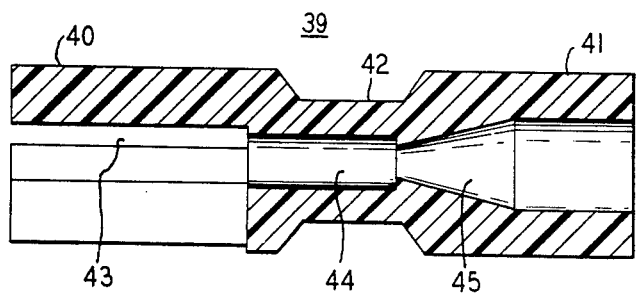
FIG. 5 is a sectional view of the connector body as shown generally along plane 5—5 of FIG. 3.

In FIGS. 3, 4 and 5, there is shown an opening 44 in the connector body 39. The opening 44 extends axially, as shown in FIG. 5, from the enclosed ends of slots 43 through the first cylindrical portion 40 and the third cylindrical portion 42. The opening 44 has a cross-sectional shape of an equilateral triangle with rounded corners and is oriented, as shown in FIG. 4, in such a way that each of the bisectors 57 of the angles of the equilateral triangle is offset by an angle of 30 degrees from the center line 58 of each slot 43. The cross-sectional area of the opening 44 is small enough so that the inner rods 37, when forced into the opening 44, are held in tangential contact with each other. The opening 44 has to be deep enough so that the inner rods 37 are held in contact along their entire length.

In FIG. 5, there is shown an opening 45 having a truncated conical and cylindrical section. The opening 45 extends axially from the bottom of the triangular opening 44 through the second cylindrical portion 41. The opening 45 has to be sufficiently large at its narrowest point to accommodate the fiber 31.

Connector 30 is assembled as follows. First, the three inner rods 37 are inserted into the triangular opening 44, as shown in FIG. 2. The three inner rods 37 are substantially parallel to each other and form the aperture 54 for receiving the fiber 31. The diameter $D_1$ of each of the inner rods 37 is related to the diameter $d$ of the fiber 31 by the following expression:

$$D_1 = 6.4627d.$$

The inner rods 37 have to be long enough so that after one set of ends of the inner rods 37 is inserted into the opening 44, shown in FIG. 3, the free ends of the inner rods 37 extend past the first cylindrical portion 40, as shown in FIG. 2.

Once the inner rods 37 are in place, the fiber 31 is inserted into the opening 45 of the cylindrical portion 41, shown in FIG. 5. The fiber 31 is pushed through the opening 45 into the aperture 54, shown in FIG. 2, until one end of the fiber 31 extends slightly past the ends of the three inner rods 37. The inner rods 37 hold the fiber 31 so that the longitudinal axis of the fiber 31 is substantially parallel to the longitudinal axis of each of the inner rods 37. When the fiber 31 is in place, an adhesive, such as silicone rubber, is inserted into the opening 45, shown in FIG. 5, and portions of aperture 54, shown in FIG. 2, which are not occupied by the fiber 31. The adhesive anchors the fiber 31 to the second cylindrical portion 42 and fastens the fiber 31 and the three inner rods 37 together.

After the adhesive sets, the end of the fiber 31 held by the three inner rods 37 is polished until it is flush with the ends of the inner rods 37 and lies in the planar surface 55, shown in FIG. 2, which is substantially perpendicular to the longitudinal axis of the fiber 31.

As indicated in FIG. 2, each outer rod 38 is pressed into a different one of the slots 43 located in the first cylindrical portion 40. The outer rods 38 are positioned so that they do not bottom out in the slots. The maximum length of each of the rods 38 is such that if a rod 38 is bottomed out in a slot 43, the free end of the rod 38 extends past the free ends of rods 37 by an amount which is equal to or less than the amount the free ends of the inner rods 37 extend past the end of the first cylindrical portion 40. This is to insure that outer rods 38 will not bottom out against the connector body of connector 30' when connectors 30 and 30' are mated. Each outer rod 38 comes in contact with a different one of the inner rods 37. The diameter $D_2$ of each of the outer rods 38 is related to the diameter $D_1$ of each of the inner rods 37 by the following expression:

$$D_2^2 - 2D_1D_2 + 0.1111D_1^2 = 0.$$

Once the assembly of the connector body 39 is complete, the first cylindrical portion 40 is pressed into the housing 33. The pressing operation is done in a fixture which positions the face of the flange 35 and the ends of the inner rods 37 in the same planar surface 55. The fixture also adjusts the position of each of the outer rods 38 so that the ends of the outer rods 38 extend past the ends of the inner rods 37 the same amount that the ends of the inner rods 37 extend past the end of the first cylindrical portion 40. Tabs 36 are then bent down over the third cylindrical portion 42, anchoring the connector body 39 to the housing 33.

What is claimed is:

1. A hermaphrodite optical fiber connector comprising:
    a first housing having a cylindrical opening extending axially therethrough,
    a connector body disposed within said first housing and having an end portion with three equally circumferentially spaced radially extending slots therein,
    a second portion of said connector body adjacent to said end portion having an aperture running axially therethrough and being of substantially triangular cross section,
    a third portion of said connector body adjacent said second portion having an axially aligned aperture with a truncated conical cross section,
    three substantially identical cylindrical inner rods partly disposed within the triangular cross sectioned aperture, said inner rods being thereby held in tangential contact with each other so that they form a holding channel,
    an optical fiber disposed within the holding channel formed by the inner rods, the end of the fiber and ends of said inner rods terminating in a planar surface substantially perpendicular to the longitudinal axis of the fiber,
    three substantially identical cylindrical outer rods interference fitted in said connector body slots with the ends of said outer rods extending beyond said planar surface to protect the end of the fiber, the diameter of said outer rods being substantially greater than the diameter of said inner rods, the ends of said outer rods being hemispherically shaped;

a duplicate housing having a cylindrical opening extending axially therethrough;

a duplicate connector body disposed within said duplicate housing and having an end portion with three equally circumferentially spaced radially extending slots therein, a second portion of said duplicate connector body adjacent to the end portion thereof having an aperture running axially therethrough and being of substantially triangular cross section, a third portion of said duplicate connector body adjacent the second portion thereof having an axially aligned aperture with a truncated conical cross section, three substantially identical cylindrical inner rods partly disposed within the triangular cross sectioned aperture in said duplicate connector body, said inner rods being thereby held in tangential contact with each other so that they form a holding channel, an optical fiber disposed within the holding channel formed by the latter inner rods, the end of the fiber and ends of the latter inner rods terminating in a planar surface substantially perpendicular to the longitudinal axis of the fiber, three substantially identical cylindrical outer rods interference fitted in said duplicate connector body slots with the ends of said outer rods extending beyond said planar surface to protect the end of the fiber, the diameter of the latter outer rods being substantially greater than the diameter of the latter inner rods, the ends of the latter outer rods being hemispherically shaped, all of said outer rods being of the same diameter $D_2$ and all of said inner rods being of the same diameter $D_1$, said first and duplicate housings being mated by slidably engaging each of said plurality of outer rods so that the interdigitated tangentially contacting outer rods form a six-sided nest containing each of the plurality of inner rods.

2. The connector as defined in claim 1 wherein the diameter $D_1$ of the inner rods and diameter $D_2$ of the outer rods are related by the expression:

$$D_2^2 - 2D_1D_2 + 0.1111D_1^2 = 0.$$

* * * * *